(12) United States Patent
Seller

(10) Patent No.: US 8,699,607 B2
(45) Date of Patent: Apr. 15, 2014

(54) DIVERSITY RECEPTION

(75) Inventor: Olivier Bernard Andre Seller, Auribeau-sur-Siagne (FR)

(73) Assignee: Cambridge Silicon Radio Limited, Cambridge (GB)

( * ) Notice: Subject to any disclaimer, the term of this patent is extended or adjusted under 35 U.S.C. 154(b) by 691 days.

(21) Appl. No.: 12/922,254

(22) PCT Filed: Mar. 12, 2009

(86) PCT No.: PCT/EP2009/052948
§ 371 (c)(1),
(2), (4) Date: Oct. 8, 2010

(87) PCT Pub. No.: WO2009/112560
PCT Pub. Date: Sep. 17, 2009

(65) Prior Publication Data
US 2011/0013727 A1    Jan. 20, 2011

(30) Foreign Application Priority Data
Mar. 12, 2008  (GB) .................................. 0804616.1

(51) Int. Cl.
*H04B 7/02*  (2006.01)
*H04L 1/02*  (2006.01)

(52) U.S. Cl.
USPC ........... 375/267; 375/256; 375/262; 375/285; 375/347; 375/349

(58) Field of Classification Search
USPC ......... 375/130–133, 135–136, 140–141, 144, 375/146–148, 229–232, 259–261, 267–268, 375/271, 279–285, 295–296, 298–300, 316, 375/320, 322, 324–326, 329, 332, 340–341, 375/346–350
See application file for complete search history.

(56) References Cited

U.S. PATENT DOCUMENTS

| | | | | |
|---|---|---|---|---|
| 6,023,615 | A | * | 2/2000 | Bruckert et al. ........... 348/14.08 |
| 2004/0208255 | A1 | * | 10/2004 | Yoshida et al. ............... 375/260 |
| 2008/0137718 | A1 | * | 6/2008 | Cha et al. ...................... 375/146 |

FOREIGN PATENT DOCUMENTS

EP  1 367 788 A  12/2003

OTHER PUBLICATIONS

Srivastava, "Practical Algorithms for Soft-Demapping of Dual-Carrier Modulated Symbols," 10th IEEE Singapore International Conference on Communication Systems (ICCS 2006), Oct. 2006, pp. 1-5.

(Continued)

*Primary Examiner* — Sam K Ahn
*Assistant Examiner* — James M Perez
(74) *Attorney, Agent, or Firm* — Vorys, Sater, Seymour and Pease LLP; Vincent M. DeLuca

(57) ABSTRACT

A receiver for receiving signals of a protocol in which traffic data is redundantly modulated onto both of two carriers according to a predetermined decision scheme, the receiver comprising: an input for receiving signals on the two carriers; a demodulator for demodulating the signals received on each of the two carriers to form two respective received data streams; first transformation logic for generating a first candidate set of traffic data by processing the received data streams by the functional inverse of the predetermined decision scheme; second transformation logic for generating a second candidate set of traffic data by aggregating corresponding bits of each of the received data streams; and a traffic data set selector for selecting data from either the first candidate set of traffic data or from the second candidate set of traffic data for further processing, the traffic data set selector being configured to make that selection in dependence on the relative strength with which signals on the two carriers are received.

15 Claims, 3 Drawing Sheets

(56) References Cited

OTHER PUBLICATIONS

German Office Action dated Mar. 5, 2012 in corresponding German application.

Wang et al, "A Technique for Demapping Dual Carrier Modulated UWB OFDM Signals with Improved Performance," Proceedings of the IEEE Vehicular Technology Conference, vol. 1, pp. 38-42, Sep. 2005.

* cited by examiner

DIVERSITY RECEPTION

This invention relates to detecting bits of a received signal using a diversity receiver.

Figure 1:
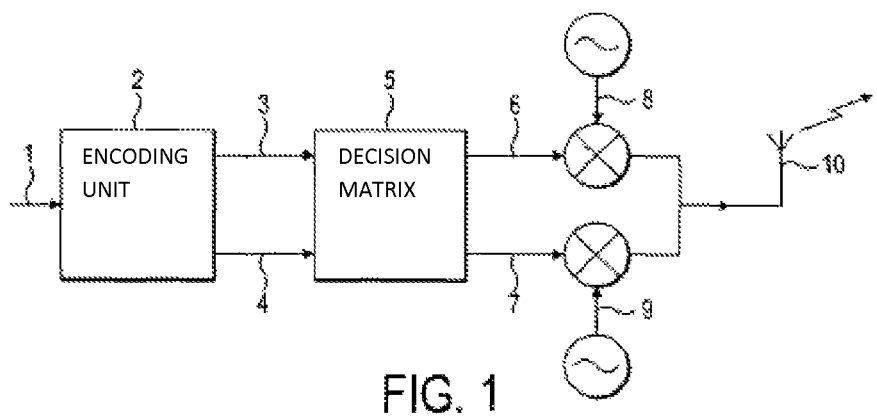

FIG. 1 illustrates schematically the channel encoding system in one example of a dual carrier modulation (DCM) transmitter. A bit stream 1 for transmission is passed to an encoding unit 2 which generates two streams 3, 4 of QPSK (quaternary phase shift keyed) data. Those streams pass to a decision matrix 5 which generates two streams 6, 7 of 16 QAM (16 state quadrature amplitude modulation) data. The matrix 5 operates in such a way that both QAM streams are dependent on both QPSK streams, with the result that if either one of the QAM streams is received perfectly then a receiver can recover both QPSK streams from it. Each QAM stream is used to modulate a respective tone 8, 9 and the resulting signals are combined and transmitted from an antenna 10.

Figure 2:
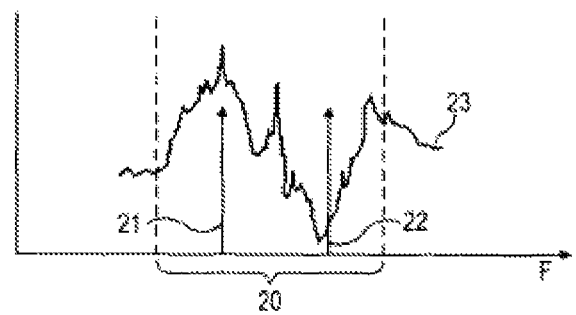

This scheme is used in the modern UWB (ultra-wideband) protocol. FIG. 2 illustrates a channel of that system. The channels are 528 Mhz wide. When a particular channel (e.g. channel 20) is being used the tones 21, 22 are spaced 210 MHz apart from each other.

One reason for transforming the QPSK data streams to QAM data streams in this way is to introduce additional diversity into the system. It would be possible to modulate two carriers directly with respective ones of the QPSK data streams. However, that would require the receiver to receive successfully at both carrier frequencies in order to fully recover the original data. In practice (as illustrated by noise level 23 in FIG. 2) it is less likely that there will be poor propagation conditions at both of the carrier frequencies than at one. The scheme described above has the advantage that it allows the original data to be recovered even if only one carrier is received.

At the receiver, irrespective of whether fading or interference is present some form of signal will be received at each of the carrier frequencies. If reception is perfect then the data bits decoded from each carrier will agree, but otherwise the receiver must have a strategy for deciding which bits to rely upon. One way to do this is by using a maximum likelihood decoder, such as a list decoder or a sphere decoder. However, maximum likelihood decoders have the disadvantage that they are complex to implement. They use up a significant amount of circuit real-estate and consume a significant amount of power. These features are especially disadvantageous when the receiver is implemented on an integrated circuit or is to be used in a battery-powered device.

Figure 3:
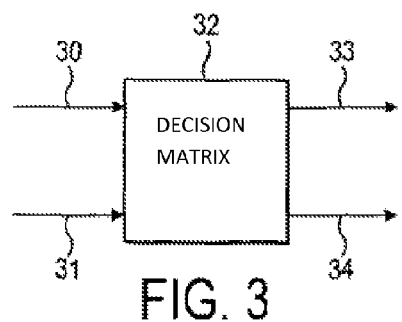

A simpler method of using data from both carriers is to apply the data bits received on each carrier to a decision matrix irrespective of any information about their reliability. This approach is illustrated in FIG. 3. QAM data on each of the carriers is applied via lines 30 and 31 respectively to a decision matrix 32. Decision matrix 32 is the inverse of the decision matrix 5 that is used in the transmitter. The decision matrix outputs two streams of QPSK data 33, 34 which can then be further processed. This method is simple to implement and works well when reception conditions are good, but simulations suggest that it can lose significant amounts of data when the received signal has been subject to multipath fading. Another method is to use MMSE matrix inversion, which is more efficient when multipath is present, but in this approach a matrix inversion is required for each couple of tones so complexity is high.

There is therefore a need for an improved method for receiving signals in the above and similar protocols.

According to one aspect of the present invention there is provided a receiver for receiving signals of a protocol in which traffic data is redundantly modulated onto both of two carriers according to a predetermined decision scheme, the receiver comprising: an input for receiving signals on the two carriers; a demodulator for demodulating the signals received on each of the two carriers to form two respective received data streams; first transformation logic for generating a first candidate set of traffic data by processing the received data streams by the functional inverse of the predetermined decision scheme; second transformation logic for generating a second candidate set of traffic data by aggregating corresponding bits of each of the received data streams; and a traffic data set selector for selecting data from either the first candidate set of traffic data or from the second candidate set of traffic data for further processing, the traffic data set selector being configured to make that selection in dependence on the relative strength with which signals on the two carriers are received.

The traffic data set selector may be arranged to select bits from either the first candidate set of traffic data or from the second candidate set of traffic data for further processing. The selection may be made for that/those bits independently of one or more other bits in the first and second sets of traffic data, in dependence on the relative strength with which signals on the two carriers are received.

The traffic data set selector may be configured to select data from the second candidate set of traffic data for further processing if the difference between the strengths with which the two carriers are received is greater than a predetermined threshold, and otherwise select data from the first candidate set of traffic data for further processing. The said threshold may be between 4 dB and 8 dB.

The traffic data set selector may be configured to determine whether the ratio of the strengths of the two carriers lies (a) above a first threshold, (b) between the first threshold and a second threshold, (c) between the second threshold and a third threshold, (d) between the third threshold and a fourth threshold or (e) below the fourth threshold, and to select data from the second or first candidate sets of traffic data for further processing in dependence on that determination. The first threshold may be greater than the second threshold. The third threshold may equal the inverse of the second threshold. The fourth threshold may equal the inverse of the first threshold.

The first threshold may be approximately 6 dB. The second threshold may be approximately 3 dB.

The traffic data set selector may be arranged to select data from the second or first candidate sets of traffic data for further processing in dependence on the said determination in such a way as to select those bits of the second or first candidate set that are more strongly indicated by a ratio of signal strengths as so determined.

The second transformation logic may be arranged to generate the second candidate set of traffic data by aggregating corresponding bits of each of the received data streams and deinterleaving those aggregated bits.

The traffic data may be modulated onto the carriers by a QAM modulation scheme. The modulation scheme may be 16 QAM. The candidate sets of traffic data may be in the form of QPSK data streams. The receiver may be an ultrawideband receiver.

The demodulator may be arranged to form the received data streams so that each bit of each stream is represented by multiple bits that collectively represent a value indicative of the confidence with which each bit of the respective stream has been received. The second transformation logic may be arranged to aggregate corresponding bits of each of the received data streams by adding together the values that represent those bits.

The first transformation logic may be arranged to process the received data streams by means of a decision matrix that implements the functional inverse of the predetermined decision scheme.

The first carrier may be at a first frequency and the second carrier may be at a second, different frequency.

According to a second aspect of the present invention there is provided a method for receiving signals of a protocol in which traffic data is redundantly modulated onto both of two carriers according to a predetermined decision scheme, the method comprising: receiving signals on the two carriers; demodulating the signals received on each of the two carriers to form two respective received data streams; generating a first candidate set of traffic data by processing the received data streams by the functional inverse of the predetermined decision scheme; generating a second candidate set of traffic data by aggregating corresponding bits of each of the received data streams; and selecting data from either the first candidate set of traffic data or from the second candidate set of traffic data for further processing, the traffic data set selector being configured to make that selection in dependence on the relative strength with which signals on the two carriers are received.

Figure 4:
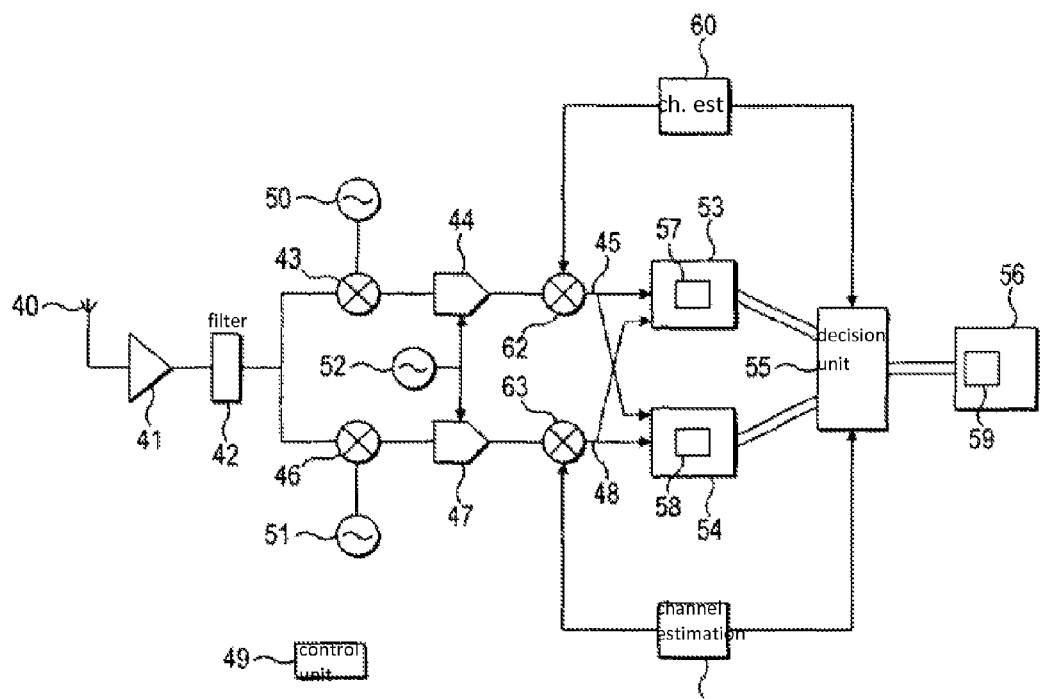
Figure 5:
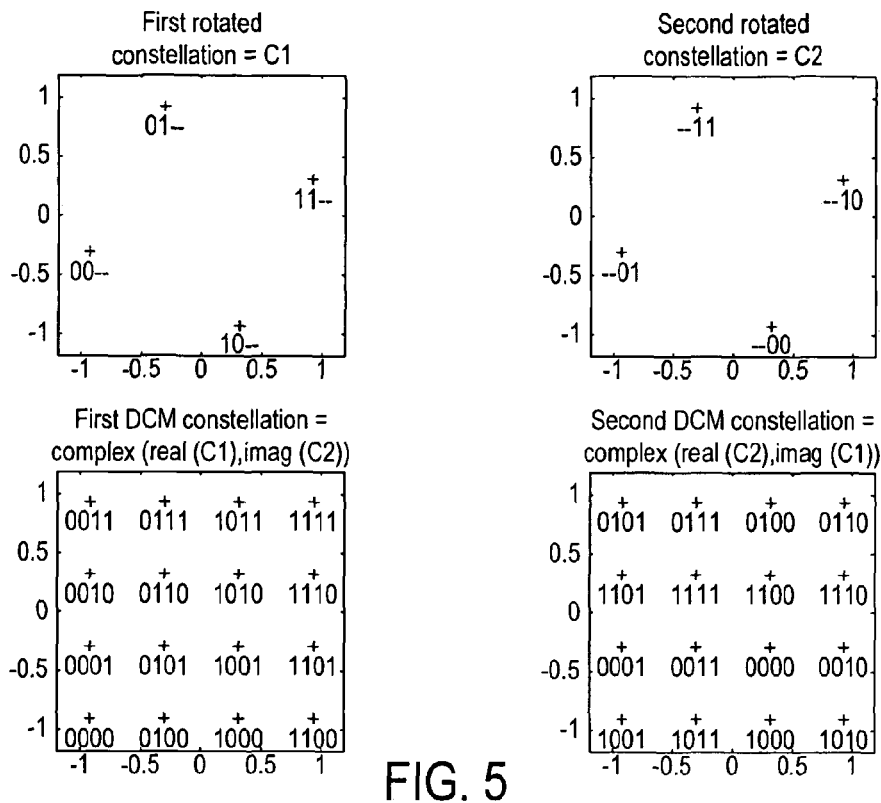
Figure 6:
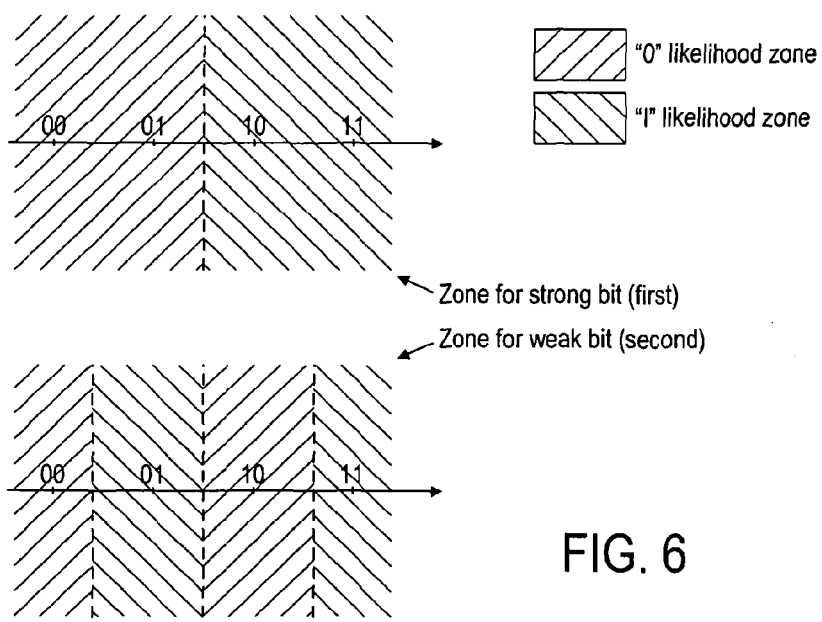

The present invention will now be described by way of example only, with reference to the accompanying drawings. In the drawings:

FIG. 1 illustrates a transmitter;
FIG. 2 illustrates a UWB channel;
FIG. 3 illustrates one design of receiver;
FIG. 4 illustrates an alternative design of receiver;
FIG. 5 illustrates an encoding scheme; and
FIG. 6 illustrates bit values resulting from that encoding scheme.

The receiver to be described below has two available decision techniques for determining data bits from two received QAM signals. Each technique can be implemented by a simple decision matrix or other deterministic logic. The techniques are such that one performs better in a first set of reception circumstances, and the other performs better in other reception circumstances. The receiver selects between the techniques on the basis of the relative strength with which the two QAM signals are received.

FIG. 4 is a schematic diagram of a receiver suitable for receiving signals of a protocol in which two symbol streams of a first type are encoded at the transmitter into two symbol streams of a second type in such a way that each symbol stream of the second type contains information that defines all the symbols of both symbol streams of the first type. In this example, the first type is QPSK and the second type is 16 QAM, and the QAM streams are formed from the QPSK streams in such a way that if the bits $b_n$ carried by the QPSK streams are:

QPSK stream 1: $b_0, b_1, b_4, b_5 \ldots$
QPSK stream 2: $b_2, b_3, b_6, b_7 \ldots$ then the bits carried in the consequent QAM streams are:

QAM stream 1: $b_0, b_1, b_2, b_3, b_4, b_5, b_6, b_7 \ldots$
QAM stream 2: $b_0, b_1, b_2, b_3, b_4, b_5, b_6, b_7 \ldots$ The symbol streams of the second type are then transmitted over respective channels for reception at a receiver. In one example, the symbol streams of the second type could be transmitted wirelessly at respective radio carrier frequencies, as in the UWB protocol. The transmitter that performs the transformation between symbol streams and the multi-carrier transmission could be as described above with reference to FIG. 1.

FIG. 4 shows a receiver suitable for receiving such UWB signals. The receiver comprises an antenna 40, an amplifier 41 and a filter 42, which receive, amplify and bandpass filter a received signal. The received signal is then split into two paths. Each path processes signals at a respective one of the two carrier frequencies of a selected UWB channel. In the first path the upper carrier is downconverted in a mixer 43 and then sampled by a sampling unit 44. The sampling unit 44 detects the received QAM symbols and outputs the bits represented thereby in a first stream of QAM bits at 45. In a second path the lower carrier is downconverted in a mixer 46 and sampled in a similar way by a sampling unit 47 to yield a second stream of QAM bits at 48. A control unit 49 has knowledge of which channel is currently to be received and signals oscillators 50, 51 for operation in accordance with at the upper and lower carrier frequencies of that channel. The sampling units 44, 47 are clocked by a common clock 52 at the expected symbol frequency and phase of the QAM symbol streams.

The first and second sampled data are equalized by mixers 62 and 63, according to channel estimation coefficients provided by blocks 60 and 61. The equalization consists in a multiplication of sampled data by complex conjugate of the channel estimation.

The first and second symbol streams are both provided to two transformation blocks 53, 54. Each transformation block performs a respective type of transformation from QAM bits to QPSK data bits based on the received QAM bitstreams. The outputs of the transformation blocks are passed to a decision unit 55 which selects which of those outputs should be passed to a processing unit 56 for further receive processing.

Transformation block 53 comprises a decision matrix 57 which implements logic that is the functional inverse of the logic used during transmission to transform the original QPSK data to QAM data. The decision matrix could be implemented in any suitable manner so that it achieves the opposite transformation to the one that is used during transmission. The first and second QAM symbol streams are applied to inputs of the matrix 57 and the matrix 57 provides outputs 58, 59 that represent candidates for the two QPSK symbol streams that are sought to be recovered.

Transformation block 54 implements an approximate log likelihood ratio (LLR) decision algorithm. This is implemented by aggregating corresponding, synchronous bits derived from the first and second QAM symbol streams; taking the resulting aggregated bitstream as a representation of the bits represented by the received QAM signal; and then deriving received QPSK bits from that representation. Thus, if the bits represented by the recovered QAM symbol streams are as follows:

QAM stream 1: $b_{01}, b_{11}, b_{21}, b_{31}, b_{41}, b_{51}, b_{61}, b_{71} \ldots$
QAM stream 2: $\bar{b}_{02}, \bar{b}_{12}, \bar{b}_{22}, \bar{b}_{32}, \bar{b}_{42}, \bar{b}_{52}, \bar{b}_{62}, \bar{b}_{72} \ldots$ Then the aggregated bitstream is formed as $\{b_{01} \sim \bar{b}_{02}\}, \{b_{11} \sim \bar{b}_{12}\}, \{b_{21} \sim \bar{b}_{22}\}, \ldots$ where $\sim$ represents an aggregating function. In a preferred embodiment each bit $b_{01}$ etc. in the received bitstreams is represented by multiple bits (e.g. three bits) indicating on a scale from 0 to 1 the confidence with which the bit is 0 or 1 respectively, and the result of the aggregating function is an aggregated representation of the received value of the bit, taking into account the confidence with which it is received on each carrier. In such a scheme, the aggregating function can be implemented simply by adding the corresponding bits of the received QAM streams. Alternatively, for example, the corresponding bits could be averaged using any suitable algorithm such as equal gain combining, zero forcing combining or maximum ratio combining. Maximum ratio combining has been found to work well. A further alternative is to output a bitstream in which the bits are not aggregates of corresponding bits in the input stream but are instead each equal to a selected one of the two corresponding bits in the input stream: for example the more reliable of the two. The confidence values associated with each bit can be determined in any suitable manner depending on the modulation scheme that is in use.

To implement the above logic, the transformation block 54 may comprise an aggregating unit 58 for performing a chosen aggregating function on successive pairs of corresponding bits.

Pairs of QPSK bitstreams are provided to the decision unit 55 from both of the transformation blocks 53, 54. For each bit position the decision unit decides whether to provide for further processing (a) the corresponding QPSK bit from the transformation block 53 or (b) the corresponding QPSK bit from the transformation block 54. It makes that decision based on the relative strength with which signals at the two carrier frequencies of the current channel are received. If the first signal is received more strongly than the second signal by more than a first predetermined threshold, or if second signal is received more strongly than first signal by a second predetermined threshold, then the log likelihood values from block 54 are used. Otherwise the inverse decision matrix values from transformation block 53 are used. The two thresholds are bit position dependant: i.e. individual bits or pairs of bits are selected independently according to the result of comparison of the relative signal strengths with the thresholds. The decision unit may compare the signal strengths of the received signals continually or periodically, depending on the fading characteristics of the environment in which it is expected to be used, and use the result of that comparison for decision purposes until the next comparison is made. The thresholds' values could, for example, be in the range from 1 to 12 dB, more preferably in the range from 2 to 8 dB, and most preferably around 3 dB and/or 6 dB.

Representations of the QPSK bitstreams can then be derived by deinterleaving the aggregated QAM bitstream according to the inverse of the interleaving pattern used during transmission. This can be done by deinterleaving unit 59.

FIG. 5 shows the construction of DCM for QPSK using rotations in accordance with the scheme laid down in the Wimedia specification. The second DCM constellation is rotated by −pi/2. This can be easily translated to an orthogonal 4×4 matrix (matrix 5), which maps a point in $\{-1,1\}^4$ to a point in $\{-3/\text{sqrt}(10),-1/\text{sqrt}(10),1/\text{sqrt}(10),3/\text{sqrt}(10)\}^4$ In one preferred implementation that uses QPSK, the decision is made pair-wise for bits derived from a particular symbol in dependence on the relative signal to noise ratios (SNRs) of the first and second QAM signals. In this example the decision is based on the ratio of the SNR of one QAM signal (signal A) to the SNR of the other QAM signal (signal B): i.e. $SNR_A/SNR_B$. In this implementation two thresholds are employed. The thresholds could be chosen to achieve best performance in a given system, but could for instance be 3 dB and 6 dB. The thresholds define five zones, as listed in the following table. The table also shows how the output bits are selected in dependence on that relative SNR applying.

| Relative SNR ($SNR_A/SNR_B$) | Selected output bits |
|---|---|
| $SNR_A$ exceeds $SNR_B$ by 6 dB or more | All bits taken from approximate LLR channel |
| $SNR_A$ exceeds $SNR_B$ by 3 dB or more, but by less than 6 dB | Bits 0 and 2 taken from approximate LLR channel, bits 1 and 3 taken from decision matrix channel |
| $SNR_A$ and $SNR_B$ differ by less than 3 dB | All bits taken from decision matrix channel |
| $SNR_B$ exceeds $SNR_A$ by 3 dB or more, but by less than 6 dB | Bits 0 and 2 taken from decision matrix channel, bits 1 and 3 taken from approx LLR channel |
| $SNR_B$ exceeds $SNR_A$ by 6 dB or more | All bits taken from approximate log likelihood channel |

This scheme is explained with reference to FIG. 6. The signal states on each of the four I/Q dimensions of a 16 QAM symbol are independent. Each dimension carries two bits. As shown in FIG. 6, which illustrates the decoding process for one such dimension, one of the bits encoded on the dimension is strongly indicated by an increasing signal value (either positive or negative) on that dimension, whereas the other bit varies more sensitively. For this reason, in the second and fourth states listed in the table above, the "strong" and "weak" bits are taken from different channels.

Instead of using a decision matrix, the bits could be calculated directly but this is more computationally intensive.

Matlab code for implementing a version of the decision algorithm is listed below.

```
ConstSum=4*(2*A+B)/5; % alternatively=3*(2*A+B)/4
ConstDif=4*(A-2*B)/5; % alternatively=3*(A-2*B)/4
% equivalent of decision matrix calculation
Both3=real(ConstSum);
Both1=imag(ConstSum);
Both2=real(ConstDif);
Both0=imag(ConstDif);
% approximate LLR calculation
ApproxLLR3=(real(A)+sign(real(B)).*(abs(real(B))-sign
    (real(B)).*B_COEFF)-B_COEFF));
ApproxLLR1=(imag(A)+sign(imag(B)).*(abs(imag(B))-
    sign(imag(B)).*B_COEFF)-B_COEFF));
ApproxLLR2=(-real(B)+sign(real(A)).*(abs(real(A))-
    sign(real(A)).*A_COEFF)-A_COEFF));
ApproxLLR0=(-imag(B)+sign(imag(A)).*(abs(imag
    (A)-sign(imag(A)).*A_COEFF)-A_COEFF));
% apply 3 dB and 6 dB thresholds
A6 dB_B=(A_COEFF>=4*B_COEFF);
A3 dB_B=(A_COEFF>=2*B_COEFF) & ~A6 dB_B;
B6 dB_A=(B_COEFF>=4*A_COEFF);
B3 dB_A=(B_COEFF>=2*A_COEFF) & ~B6 dB_A;
A_B_eq=~(A6 dB_B|A3 dB_B|B6 dB_A|B3 dB_A);
A6 dB_B_Ind=find(A6 dB_B);
A3 dB_B_Ind=find(A3 dB_B);
B6 dB_A_Ind=find(B6 dB_A);
B3 dB_A_Ind=find(B3 dB_A);
A_B_eq_Ind=find(A_B_eq);
% Assign selections:
% A 6 dBs better than B:
% approxLLR for all
Used3(A6 dB_B_Ind)=ApproxLLR3(A6 dB_B_Ind);
Used2(A6 dB_B_Ind)=ApproxLLR2(A6 dB_B_Ind);
Used1(A6 dB_B_Ind)=ApproxLLR1(A6 dB_B_Ind);
Used0(A6 dB_B_Ind)=ApproxLLR0(A6 dB_B_Ind);
% A 3 dBs better than B:
% approxLLR for poor bits with A (0 and 2);
% decision matrix for rich bits with A (1 and 3)
```

Used3(A3 dB_B_Ind)=Both3(A3 dB_B_Ind);
Used2(A3 dB_B_Ind)=ApproxLLR2(A3 dB_B_Ind);
Used1(A3 dB_B_Ind)=Both1(A3 dB_B_Ind);
Used0(A3 dB_B_Ind)=ApproxLLR0(A3 dB_B_Ind);
% B 6 dBs better than A:
% approxLLR for all
Used3(B6 dB_A_Ind)=ApproxLLR3(B6 dB_A_Ind);
Used2(B6 dB_A_Ind)=ApproxLLR2(B6 dB_A_Ind);
Used1(B6 dB_A_Ind)=ApproxLLR1(B6 dB_A_Ind);
Used0(B6 dB_A_Ind)=ApproxLLR0(B6 dB_A_Ind);
% B 3 dBs better than A:
% approxLLR for poor bits with B (1 and 3)
% decision matrix for rich bits with B (0 and 2)
Used3(B3 dB_A_Ind)=ApproxLLR3(B3 dB_A_Ind);
Used2(B3 dB_A_Ind)=Both2(B3 dB_A_Ind);
Used1(B3 dB_A_Ind)=ApproxLLR1(B3 dB_A_Ind);
Used0(B3 dB_A_Ind)=Both0(B3 dB_A_Ind);
% Neither A or B is 3 dBs better than each other:
% decision matrix for all
Used3(A_B_eq_Ind)=Both3(A_B_eq_Ind);
Used2(A_B_eq_Ind)=Both2(A_B_eq_Ind);
Used1(A_B_eq_Ind)=Both1(A_B_eq_Ind);
Used0(A_B_eq_Ind)=Both0(A_B_eq_Ind);

Despite being relatively simple, this strategy has been found through simulations to be highly advantageous, in that it yields a relatively high quality of data reception without the need for complex maximum likelihood processing. The transformation blocks 53 and 54 can be implemented in simple logic, so they do not consume much power or circuit area, and selecting between them on the basis of signal strength involves a simple metric that will not require additional calculations to be performed in many receivers. The signal strength could be measured in any suitable manner. For example, measures of signal strength could be derived from channel estimation blocks 60, 61 and fed to the decision unit 55, by computation the squared magnitude of complex coefficients that represent channel estimates.

It has been found that the inverse decision matrix strategy of block 53 is relatively effective in the event of AWGN (additive white Gaussian noise) interference, whereas the log likelihood strategy of block 54 is relatively effective in the event of multipath interference. One indicator of the relative influence of these forms of interference on the currently received signal is the relative strength with which the signals on the two carriers have been received.

The selected bitstreams are passed for further processing in baseband block 56. The subsequent processing could include error checking and/or correction and presenting the resulting data in visual or audible form to a user.

The above technique is particularly applicable to data that is encoded over pairs of channels in parallel, and that is coded from QPSK or the like to QAM, for example 16 QAM. In the example above, the signals arrive at the receiver by radio. The present system is applicable to other forms of transmission channel.

Some or all of the receiver can be implemented on a single integrated circuit, on multiple integrated circuits or using discrete components.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A receiver for receiving signals of a protocol in which traffic data is redundantly modulated onto both of two carriers according to a predetermined decision scheme, the receiver comprising:
    an input for receiving the signals on the two carriers;
    a demodulator for demodulating the signals received on each of the two carriers to form two respective received data streams;
    first transformation logic for generating a first candidate set of traffic data by processing the received data streams by the functional inverse of the predetermined decision scheme;
    second transformation logic for generating a second candidate set of traffic data by aggregating corresponding bits of each of the received data streams; and
    a traffic data set selector for selecting data from either the first candidate set of traffic data or from the second candidate set of traffic data for further processing, the traffic data set selector being configured to make that selection in dependence on a ratio of the strengths of the two carriers; wherein
    the traffic data set selector is configured to determine which zone of a plurality of zones the ratio of the strengths of the two carriers lies within, the plurality of zones are defined to be (a) above a first threshold, (b) between the first threshold and a second threshold, (c) between the second threshold and a third threshold, (d) between the third threshold and a fourth threshold, and (e) below the fourth threshold, and to select data from the second or first candidate sets of traffic data for further processing in dependence on that determination.

2. A receiver as claimed in claim 1, wherein the traffic data set selector is arranged to select bits from either the first candidate set of traffic data or from the second candidate set of traffic data for further processing, the selection being made for that/those bits independently of one or more other bits in the first and second sets of traffic data, in dependence on the ratio of the strengths of the two carriers.

3. A receiver as claimed in claim 1, wherein the first threshold is greater than the second threshold, the third threshold equals the inverse of the second threshold and the fourth threshold equals the inverse of the first threshold.

4. A receiver as claimed in claim 3, wherein the first threshold is approximately 6 dB.

5. A receiver as claimed in claim 3, wherein the second threshold is approximately 3 dB.

6. A receiver as claimed in claim 1, wherein the traffic data set selector is arranged to select data from the second or first candidate sets of traffic data for further processing in dependence on the determination in such a way as to select those bits of the second or first candidate set that are more strongly indicated by the ratio of the strengths of the two carriers as so determined.

7. A receiver as claimed in claim 1, wherein the second transformation logic is arranged to generate the second candidate set of traffic data by aggregating corresponding bits of each of the received data streams and deinterleaving those aggregated bits.

8. A receiver as claimed in claim 1, wherein the traffic data is modulated onto the carriers by a QAM modulation scheme.

9. A receiver as claimed in claim 8, wherein the modulation scheme is 16QAM.

10. A receiver as claimed in claim 1, wherein the candidate sets of traffic data are in the form of QPSK data streams.

11. A receiver as claimed in claim 1, wherein the receiver is an ultrawideband receiver.

12. A receiver as claimed in claim 1, wherein the first transformation logic is arranged to process the received data streams by means of a decision matrix that implements the functional inverse of the predetermined decision scheme.

13. A receiver as claimed in claim 1, wherein the first carrier is at a first frequency and the second carrier is at a second, different frequency.

14. A receiver for receiving signals of a protocol in which traffic data is redundantly modulated onto both of two carriers according to a predetermined decision scheme, the receiver comprising:
- an input for receiving the signals on the two carriers;
- a demodulator for demodulating the signals received on each of the two carriers to form two respective received data streams;
- first transformation logic for generating a first candidate set of traffic data by processing the received data streams by the functional inverse of the predetermined decision scheme;
- second transformation logic for generating a second candidate set of traffic data by aggregating corresponding bits of each of the received data streams; and
- a traffic data set selector for selecting data from either the first candidate set of traffic data or from the second candidate set of traffic data for further processing, the traffic data set selector being configured to make that selection in dependence on the relative strength with which the signals on the two carriers are received, wherein the demodulator is arranged to form the received data streams so that each bit of each stream is represented by multiple bits that collectively represent a value indicative of the confidence with which each bit of the respective stream has been received, and the second transformation logic is arranged to aggregate corresponding bits of each of the received data streams by adding together the values that represent those bits.

15. A method for receiving signals of a protocol in which traffic data is redundantly modulated onto both of two carriers according to a predetermined decision scheme, the method comprising:
- receiving the signals on the two carriers;
- demodulating the signals received on each of the two carriers to form two respective received data streams;
- generating a first candidate set of traffic data by processing the received data streams by the functional inverse of the predetermined decision scheme;
- generating a second candidate set of traffic data by aggregating corresponding bits of each of the received data streams; and
- selecting data from either the first candidate set of traffic data or from the second candidate set of traffic data for further processing, the traffic data set selection being made in dependence on a ratio of the strengths of the two carriers and in dependence on a determination of which zone of a plurality of zones the ratio of the strengths of the two carriers lies within, the plurality of zones are defined to be (a) above a first threshold, (b) between the first threshold and a second threshold, (c) between the second threshold and a third threshold, (d) between the third threshold and a fourth threshold, and (e) below the fourth threshold.

* * * * *